United States Patent [19]

Luursema

[11] 4,256,992
[45] Mar. 17, 1981

[54] ELECTRIC DEVICE FOR STARTING AND FEEDING A METAL VAPOR DISCHARGE LAMP PROVIDED WITH A PREHEATABLE ELECTRODE

[75] Inventor: Meerten Luursema, Eindhoven, Netherlands

[73] Assignee: U.S. Philips Corporation, New York, N.Y.

[21] Appl. No.: 5,120

[22] Filed: Jan. 22, 1979

[30] Foreign Application Priority Data

Mar. 2, 1978 [NL] Netherlands .......................... 7801241

[51] Int. Cl.³ ........................................... H05B 41/29
[52] U.S. Cl. ................................... 315/106; 315/105; 315/174; 315/176; 315/219; 315/226; 315/DIG. 7
[58] Field of Search ............... 315/101, 102, 105, 106, 315/174, 176, 209 R, 219, 226, DIG. 5, DIG. 7

[56] References Cited

U.S. PATENT DOCUMENTS

| 2,586,403 | 2/1952 | Waguet | 315/165 |
| 3,818,312 | 6/1974 | Luursema et al. | 315/219 X |

FOREIGN PATENT DOCUMENTS 2439606  2/1976  Fed. Rep. of Germany .... 315/DIG. 7

*Primary Examiner*—Eugene R. LaRoche
*Attorney, Agent, or Firm*—William J. Streeter; Bernard Franzblau

[57] ABSTRACT

An arrangement for starting and operating a low-pressure mercury vapor discharge lamp provided with preheatable electrodes. The lamp is supplied from a battery via two direct-to-alternating current converters connected between the battery and the lamp. One converter is a voltage-controlled converter which exclusively effects the preheating of the electrodes, whereas the other converter supplies the lamp current only. This arrangement provides reliable ignition and operation of the lamp even in the case of a large variation in the battery voltage.

14 Claims, 1 Drawing Figure

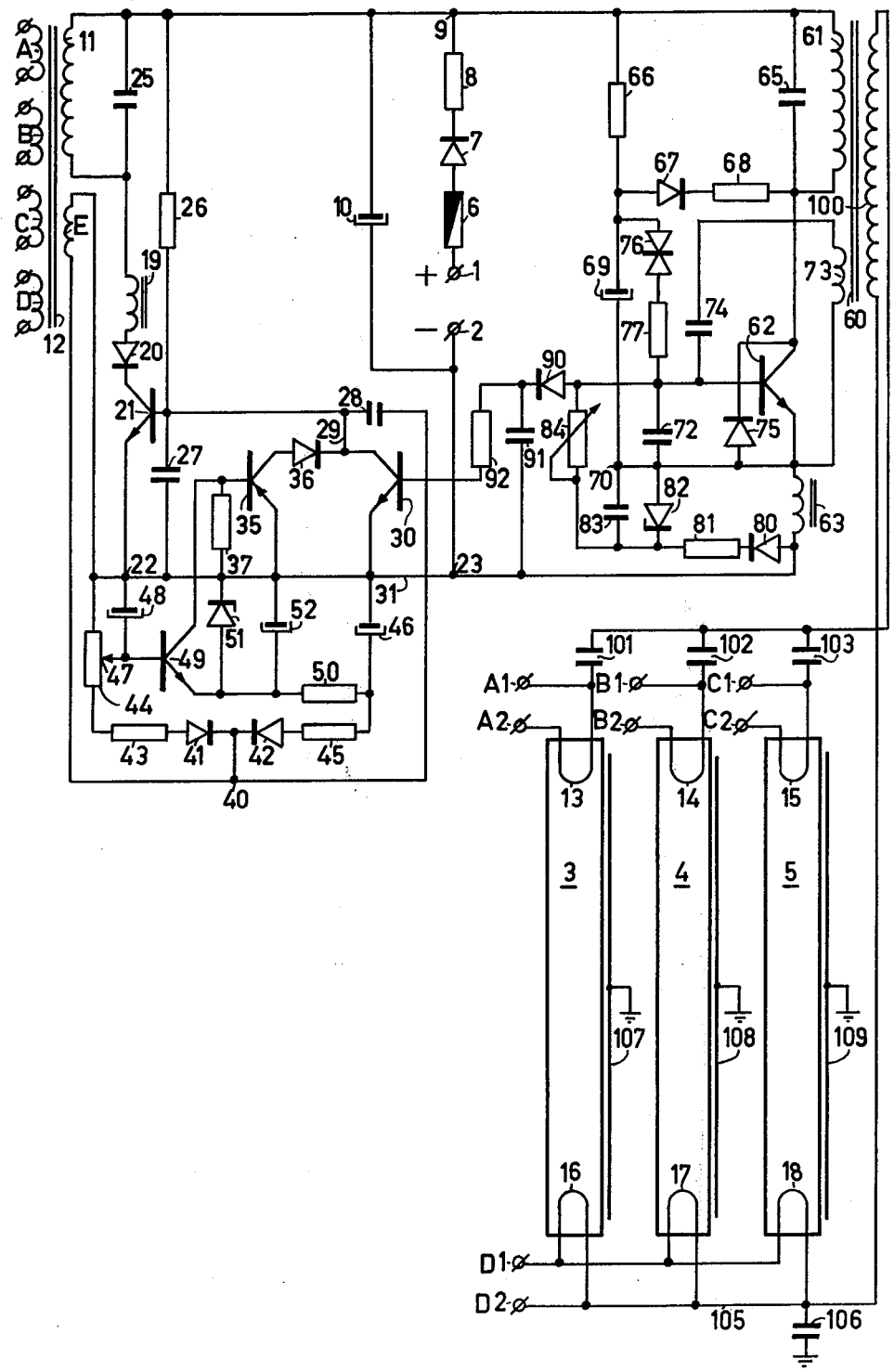

ELECTRIC DEVICE FOR STARTING AND FEEDING A METAL VAPOR DISCHARGE LAMP PROVIDED WITH A PREHEATABLE ELECTRODE

The invention relates to an electric lighting arrangement including a metal vapour discharge lamp provided with a preheatable electrode and a device for starting and feeding said lamp. The device comprises two input terminals for connection to a d.c. voltage source, a first direct-to-alternating current (DC-AC) converter for supplying a preheating current to the preheatable electrode of the lamp and connected to the input terminals, and means connected to the two input terminals for supplying a discharge current through the discharge lamp after the preheating current has been switched on.

A prior art arrangement of the kind defined above is, for example, disclosed in U.S. Pat. No. 2,586,403. A drawback of that known arrangement is that, in its operating condition, the lamp is fed with direct current. This causes an unwanted transport of the metal, participating in the discharge, in the discharge lamp. This transport is sometimes referred to as cataphoresis.

It is an object of the invention to provide an arrangement of the type mentioned in the preamble which does not have the above-mentioned drawback.

An electric lighting arrangement according to the invention includes a device for starting and operating a metal vapour discharge lamp provided with a preheatable electrode. The device comprises two input terminals for connection to a d.c. voltage source, a first direct-to-alternating current converter for supplying a preheating current to the preheatable electrode of the lamp connected to the input terminals, and means connected to the two input terminals for supplying a discharge current through the discharge lamp after the preheating current has been switched on, said means comprising a second direct-to-alternating current converter.

An advantage of this arrangement is that no cataphoresis will occur since the lamp supply is now an alternating current supply.

It is known per se to use only one direct-to-alternating current converter for starting and feeding a metal vapour discharge lamp provided with a preheatable electrode, which converter provides the preheating of the lamp electrode as well as the supply of the lamp current, wherein there is also no fear of cataphoresis (see, for example, U.S. Pat. No. 3,818,312). In this known case, the single converter cannot always operate with an optimum efficiency owing to its changing electric load—namely from the electrode preheating phase to the operating condition of the lamp. In an arrangement according to the invention two converters are provided each of which can be properly dimensioned for the respective electric load allocated to it.

An arrangement according to the invention may, for example, be used for illuminating the inside of a vehicle, for example a passenger coach or a bus.

The d.c. current source present in such a vehicle, for example a battery, may have a voltage value which in certain circumstances deviates rather considerably from its nominal voltage.

If an electric lighting arrangement is connected to such a d.c. voltage source there is a risk that the lamp of that arrangement does not always ignite, for example in the case of too low a battery voltage. To prevent this the two converters in an arrangement acoording to the invention might be implemented as voltage-controlled converters.

A voltage-controlled converter must here be understood to mean a converter whose output voltage changes not more than 5% for a variation of ±30% of the input d.c. voltage.

In an embodiment of an electric device according to the invention only the first converter is a voltage-controlled converter. An advantage of this embodiment is that reliable ignition of the lamp over a relatively large range of voltage values of the d.c. voltage source can be realized by means of a comparatively simple device, in which only the electrode preheating is voltage-controlled. It has been found that a d.c. voltage source whose voltage deviates considerably from the nominal value is less disturbing in the operating condition of the lamp than it is for starting the lamp.

In a further embodiment of an electric device according to the invention the electric power of the first converter is lower than that of the second converter. An advantage of this embodiment is that the power of the converters may then be better adapted to the magnitude, and the duration in the case of the preheating current converter, of their respective electric loads.

The converter, or each converter, of an arrangement according to the invention might, for example, be a thyristor converter.

Preferably, however, both converters are transistor converters. An advantage of this is that the electric device of the arrangement can be relatively small.

In a further embodiment of an arrangement according to the invention, in which the first converter is a voltage-controlled converter, the lamp is a low-pressure mercury vapour discharge lamp and the preheatable electrode is rated for a preheating voltage of 6.5 to 10 volts. Such an electrode is sometimes referred to as a high-voltage electrode or high-resistance electrode. An advantage of this embodiment is that so-called high-voltage electrode starter lamps can be utilized without the risk of back-arcing of these electrodes. Back-arcing must here be understood to mean the occurrence of an electric discharge between the two supporting wires of one and the same electrode. Back-arcing can be prevented by means of the voltage-controlled first converter which keeps the voltage supplied to the electrode below the arcing value.

An electric lighting arrangement according to the invention can be provided in a vehicle for illuminating the inside of that vehicle, the arrangement being connected to a battery of that vehicle. An advantage thereof is that a comparatively simple and reliable lighting arrangement can be obtained therewith.

An embodiment of an arrangement according to the invention will now be further explained with reference to the accompanying drawing which shows a circuit diagram thereof.

In the drawing reference numerals 1 and 2 denote input terminals intended for connection to a d.c. voltage source. Three low-pressure mercury vapour discharge lamps 3, 4 and 5 of 13 watts each are started and supplied by means of the further components, to be discussed hereinafter, of the electric device. A fuse 6 is connected to terminal 1. The other end of this fuse 6 is connected to a diode 7 which in its turn is connected to a resistor 8. The other end of the resistor 8 is connected to a connection point 9. A capacitor 10 is arranged between the point 9 and the input terminal 2. In addition a primary winding 11 of a transformer 12 is connected to the point 9. The transformer 12 is the so-called preheating transformer. This transformer 12 comprises five secondary windings, namely windings A through E inclusive. The winding A is connected between the terminals A1 and A2 of the preheatable electrode 13 of the lamp 3. The winding B is connected to the terminals B1 and B2 of the preheatable electrode 14 of the lamp 4. The winding C is connected between the terminals C1 and C2 of the preheatable electrode 15 of the lamp 5. Furthermore, the winding D of the transformer 12 is connected to the terminals D1 and D2. The terminals D1 and D2 are interconnected via three parallel preheatable electrodes 16 to 18 inclusive of the respective lamps 3 to 5. The above-mentioned connections from windings A to D to the respective electrodes 13 to 16 are not shown in the drawing.

The primary winding 11 of the transformer 12 is part of a voltage-controlled first dc-ac converter, the main circuit of which consists of: terminal 1, the components 6, 7, 8, 9, 11, a coil 19, a diode 20, an npn-transistor 21, a connection point 22, a further connection point 23 and thereafter back to the negative terminal 2.

The transformer winding 11 is shunted by a capacitor 25. The base of the transistor 21 is connected via a resistor 26 to the connection point 9 and via a capacitor 27 to the connection point 22. In addition, the base of the transistor 21 is connected via a capacitor 28 to secondary winding E of the transformer 12. The winding E is a feed-back winding for obtaining the control of the transistor 21.

The base of the transistor 21 is also connected, via a conductor 29, to the collector of a npn transistor 30. The emitter of the transistor 30 is connected to a conductor 31 which comprises, inter alia the connection points 22 and 23. The emitter of a pnp transistor 35 is connected to the conductor 31, while its collector is connected to the conductor 29 via a diode 36. The emitter-base junction of the transistor 35 is shunted by a resistor 37.

A so-called comparison circuit of this controlled converter will now be discussed. It is used to counteract the influence of voltage variations between the terminals 1 and 2. The secondary transformer winding E of the transformer 12 is connected on the one hand to the conductor 31 and on the other hand to a connection point 40. This connection point 40 is connected to the capacitor 28 and also to the junction of two diodes 41 and 42 whose cathodes are connected together. The other side of the diode 41 is connected via a series arrangement of resistor 43 and a potentiometer 44 to the conductor 31. The other side of the diode 42 is connected via a resistor 45 and a capacitor 46 to the conductor 31. A tap point 47 of the potentiometer 44 is connected to a capacitor 48 and to the base of a transistor 49. The other side of the capacitor 48 is connected to the conductor 31. The collector of the transistor 49 is connected to the base of the transistor 35, while the emitter of the transistor 49 is connected via a resistor 50 to the junction between the resistor 45 and the capacitor 46. In addition, the emitter of the transistor 49 is connected via a zener diode 51 and via a parallel capacitor 52 to the conductor 31.

That portion of the device which supplies the main current, that is to say the lamp current for the lamps 3, 4 and 5, will now be discussed. This main current is supplied by a non-voltage-controlled direct-to-alternating current converter of which a transformer 60 is a part. A primary winding 61 of the transformer 60 is arranged in series with a transistor 62 which, in its turn, is arranged in series with a coil 63. The main current circuit of this second converter consists of the elements 1, 6, 7, 8, 9, 61, 62, 63, point 23, input terminal 2. The primary winding 61 of the transformer is shunted by a capacitor 65. In addition, the primary winding 61 is shunted by a series arrangement of a resistor 66, a rectifier 67 and a resistor 68. A junction point between the resistor 66 and the rectifier 67 is connected to a capacitor 69. The other side of this capacitor 69 is connected to a connection point 70 which is connected to the emitter of the transistor 62. Furthermore the emitter-base junction of the transistor 62 is shunted by a capacitor 72 on the one hand and by a series arrangement of a transformer winding 73 of the transformer 60 and a capacitor 74 on the other hand. The main electrodes of the transistor 62 are interconnected by a diode 75. In addition, a series arrangement of a breakdown element 76 and a resistor 77 is arranged between the junction of the resistor 66 and the rectifier 67 on the one hand and the base of the transistor 62 on the other hand. Furthermore the end of the coil 63 which is connected to the point 23 is connected to a diode 80 which is arranged in series with a resistor 81 and a zener diode 82. The other side of the zener diode 82 is connected to the capacitor 72. The zener diode 82 is shunted by a capacitor 83. This capacitor is furthermore connected via a potentiometer 84 to the base of the transistor 62. The base of transistor 62 is connected via a series arrangement of a diode 90 and a capacitor 91 to the conductor 31. The junction between the diode 90 and the capacitor 91 is connected to the base of the transistor 30 via a resistor 92. A secondary winding 100 of the transformer 60 is connected to the lamp 3 via a capacitor 101. In addition, the winding 100 is connected via a capacitor 102 to the lamp 4 and via capacitor 103 to the lamp 5. The other side of the winding 100 is connected to a common conductor 105 which is connected to the lamp electrodes 16, 17 and 18. A capacitor 106 is connected between the conductor 105 and ground. The reference numerals 107 to 109 inclusive denote to ground starting strips for further promoting of the ignition of the lamps 3 to 5 inclusive. In the present case the starting strips are shown arranged near the lamps 3 to 5 inclusive. A starting strip might, however, also be part of a lamp.

The described circuit operates as follows.

If the terminals 1 and 2 are connected to a d.c. voltage source of nominal 72 volts, only the voltage-controlled first converter 1, 6, 7, 8, 9, 11/25, 19, 20, 21, 22, 23, 2 will start oscillating in known manner, winding E being the feedback winding. This will cause voltages to be induced in the secondary windings A to D inclusive of the transformer 12. This results in preheating of the high-voltage electrodes (8 volts rating) of the lamps 3 to 5 inclusive.

If the voltage between the terminals 1 and 2 deviates from its nominal value the influence of that deviation on the voltages of the windings of the transformer 12 will be counteracted. This is effected by a change in the discharge current of the capacitor 27, which capacitor is charged from the transformer winding E via the capacitor 28. The discharge current of the capacitor 27 flows through the series arrangement of the transistor 35, the diode 36 and the conductor 29. Changing the discharge current of the capacitor 27 results in a change in the base current of the transistor 21, and hence a change in the oscillation amplitude. This results in the maintenance of a substantially constant a.c. voltage across each of the secondary windings of the preheating transformer 12. This will be described in the further course of this description.

The transistor 35 is controlled by means of the transistor 49. The latter is controlled in its turn by a voltage which is the difference between the voltages at the capacitors 48 and 52. Said capacitor 52 is supplied from the winding E via the diode 42, the resistor 45, the resistor 50 and the buffer capacitor 46. The voltage of this capacitor 52 is stabilized by the zener diode 51. The other capacitor 48 is also supplied from the winding E, namely via the diode 41, the resistor 43 and the potentiometer tap 47. The voltage at this capacitor 48 is a measure of the voltage across the transformer winding E.

If now the input voltage between the terminals 1 and 2, that is to say the battery voltage, starts deviating from its nominal value the voltage across the winding E will start to change in the first instance, and thereby also the voltage at the capacitor 48. Owing to the stabilized voltage at the capacitor 52 a change will then, however, occur in the voltage difference between the base and the emitter of the transistor 49. As a result the collector current of the latter changes and, consequently, the collector current of the transistor 35 also changes. This changes the discharge rate of capacitor 27 and, hence, the base current in transistor 21 which, in turn, changes the oscillation amplitude in such a direction as to tend to restore the voltages across the windings of the transformer 12 to their original nominal values. Thus any change in voltage of the winding E and, consequently, any changes in the voltage of all windings of the preheating transformer 12, are counteracted.

Owing to the delaying action of the RC circuit 66, 69 the non-controlled second direct-to-alternating current converter, which includes the transformer 60, will be started a few seconds later than the voltage-controlled first converter, which ensures preheating of the lamp electrodes. This means that no voltage is induced in the secondary winding 100 of the transformer 60 until after this time delay. The lamps 3 to 5 inclusive, including the electrodes, which were preheated in the meantime, can subsequently ignite and remain in operation. Each of the capacitors 101 to 103 inclusive functions as a stabilization ballast.

The transistor 62 of the non-voltage controlled converter is controlled from the feedback winding 73 via the capacitor 74. The circuit of this converter is similar to that of the converter of FIG. 3 of the above-mentioned U.S. Pat. No. 3,818,312. The start of the non-voltage controlled converter takes place when the voltage across the capacitor 69 becomes so high that the breakdown-element 76 becomes conductive. Then the capacitor 69 discharges. The resistor 77 restricts this discharge current. In the operating condition of the non-voltage controlled converter, the series connection of the rectifier 67 and the resistor 68 functions so that the breakdown element 76 does not become conductive anymore. The diode 75 protects the transistor 62 against reverse currents.

When the non-controlled second converter becomes operative, the transistor 30 is rendered conductive via the diode 90 and the resistor 92, thereby shorting the base-emitter junction of transistor 21 and, hence, stopping the oscillation of the controlled first converter. This therefore puts an end to the direct preheating of the lamp electrodes 13 to 18 inclusive via the preheating transformer 12.

The described lighting arrangement might, for example, be used for illuminating a compartment of a railway carriage.

In a practical embodiment the nominal voltage of the battery connected between the input terminals 1 and 2 was 72 volts. The circuit elements of that embodiment had approximately the following values:

Resistor 8: 1.8 ohms
Resistor 26: 56 kohms
Resistor 37: 4.7 kohms
Resistor 43: 2.7 kohms
Resistor 44: 4.7 kohms
Resistor 45: 1 kohm
Resistor 50: 2.7 kohms
Resistor 66: 270 kohms
Resistor 68: 1 kohm
Resistor 77: 47 ohms
Resistor 81: 100 ohms
Resistor 84: 100 ohms
Resistor 92: 68 kohms
Capacitor 10: 150 $\mu$Farad
Capacitor 25: 56 nF
Capacitor 27: 0.15 $\mu$F
Capacitor 28: 22 nF
Capacitor 46: 4.7 $\mu$F
Capacitor 48: 4.7 $\mu$F
Capacitor 52: 4.7 $\mu$F
Capacitor 65: 0.12 $\mu$F
Capacitor 69: 10 $\mu$F
Capacitor 72: 0.47 $\mu$F
Capacitor 74: 68 nF
Capacitor 83: 0.68 $\mu$F
Capacitor 91: 0.47 $\mu$F
Capacitor 101: 2 nF
Capacitor 102: 2 nF
Capacitor 103: 2 nF
Capacitor 106: 1 nF
Inductance 19: 200 $\mu$Henry
Inductance 63: 95 $\mu$H.

The voltage-controlled first converter had a power of approximately 5.5 watts. The non-voltage controlled second converter had a power of approximately 39 watts.

If the battery voltage between the terminals 1 and 2 deviates 22 volts from its nominal value of 72 volts, that is to say a deviation of approximately 30% of the nominal value, the r.m.s. voltage at each of the secondary transformer windings A to D inclusive deviates approximately 0.1 volt from its nominal value of 8 volts, i.e. a deviation of approximately 1.2%. The voltage at the secondary winding 100 deviates approximately 75 volts from its nominal voltage value of 250 volts.

The lamps operated with the described electric device still functioned after having been switched on and off several hundred thousand times and were substantially free from blackening. This is predominantly due to the previously outlined manner of starting and operating by means of the two direct-to-alternating current converters.

What is claimed is:

1. In an electric light arrangement including a metal vapour discharge lamp provided with a preheatable electrode, the a device for starting and feeding said lamp comprising, two input terminals for connection to a d.c. voltage source, a first direct-to-alternating current converter coupled to the input terminals for supplying a preheating current to the preheatable electrode of the lamp, and a second direct-to-alternating current converter connected to the two input terminals for supplying a discharge current through the discharge lamp after the preheating current has been switched on.

2. An arrangement as claimed in claim 1, wherein only the first converter comprises a voltage-controlled converter.

3. An arrangement as claimed in claim 1 or 2 wherein the electric power output of the first converter is lower than that of the second converter.

4. An arrangement as claimed in claim 1 or 2 wherein the two converters each comprise a transistor converter.

5. An arrangement as claimed in claim 2 wherein the lamp comprises a low-pressure mercury vapour discharge lamp with a preheatable electrode rated for a preheating voltage of 6.5 to 10 volts.

6. A device for starting and operating a metal vapour discharge lamp having a preheatable electrode comprising, a pair of input terminals for connection to a source of DC voltage, a first DC-AC converter for producing a preheat current for the preheatable electrode of the lamp, a second DC-AC converter for producing a discharge current for the main current path of the discharge lamp during operation of the lamp, means coupling each of said converters to the input terminals independently of the DC voltage level at said terminals, and delay means coupled to the second DC-AC converter for delaying the operation thereof for a given time period subsequent to the start of operation of the first DC-AC converter.

7. A device as claimed in claim 6 wherein the first DC-AC converter comprises a voltage-controlled converter for producing a substantially constant AC output voltage despite a variation in the level of the DC input voltage.

8. A device as claimed in claim 6 or 7 wherein the first converter comprises, a transistor, a transformer having a primary winding coupled to the transistor and a secondary winding coupled to said lamp preheatable electrode, said coupling means including circuit means coupling the transistor and primary winding to the input terminals to form an oscillator circuit, and the second converter comprises, a second transistor, a second transformer having a primary winding coupled to the second transistor and a secondary winding coupled across the lamp preheatable electrode and a second lamp electrode that together define said main current path of the discharge lamp, and said coupling means further comprises second circuit means coupling the second transistor and the second transformer primary winding to the input terminals to form a second oscillator circuit.

9. A device as claimed in claim 6 or 7 wherein the first converter comprises a transistor and a transformer coupled together and to the input terminals to form an oscillator circuit, and means responsive to the operation of the second converter for inhibiting oscillations in said oscillator circuit at a given time subsequent to the start of operation of the second DC-AC converter.

10. A device as claimed in claim 6 or 7 wherein the first converter comprises, a transistor, a transformer having a primary winding coupled to the transistor and a secondary winding coupled to said lamp preheatable electrode, said coupling means including circuit means coupling the transistor and primary winding to the input terminals to form an oscillator circuit, and said transformer further includes a feedback winding coupled to a control electrode of the transistor to supply thereto a voltage that varies as a function of the amplitude of oscillations of the oscillator circuit and with a relative phase relationship tending to maintain the oscillation amplitude independent of the DC voltage level at the input terminals.

11. A device as claimed in claim 10 wherein the first converter further comprises, a capacitor coupled to the transistor control electrode and to the feedback winding and arranged so that the capacitor discharge current provides a part of the transistor control current flowing in said control electrode, a second transistor coupled to said capacitor to control the discharge rate thereof, and means coupled to the feedback winding and to a control electrode of the second transistor for controlling the current flow in the second transistor as a function of the voltage of the feedback winding.

12. A device for starting and operating a metal vapour discharge lamp having a preheatable electrode and a second electrode defining a discharge path in the lamp, said device comprising, a pair of input terminals for connection to a source of DC voltage, a first DC-AC converter coupled to the input terminals and having an output coupled to the preheatable electrode for producing only a preheat current for said electrode, a second DC-AC converter coupled to the input terminals and having an output coupled across said preheatable electrode and said second electrode only for producing a discharge current for the lamp discharge path during operation of the lamp, and means for delaying the operation of the second DC-AC converter for a given time period subsequent to the start of operation of the first DC-AC converter.

13. A device as claimed in claim 12 wherein the first DC-AC converter comprises a voltage-controlled converter for producing a substantially constant AC output voltage despite a variation in the level of the DC input voltage.

14. A device as claimed in claim 12 wherein the first converter comprises a transistor and transformer coupled together and to the input terminals to form an oscillator circuit, and further comprising means for sensing the operation of the second converter and responsive thereto for inhibiting the operation of the first converter thereby to terminate the flow of preheat current to said preheatable electrode during operation of the discharge lamp.

* * * * *